(12) United States Patent
Tsuda et al.

(10) Patent No.: US 12,191,490 B2
(45) Date of Patent: Jan. 7, 2025

(54) NONAQUEOUS ELECTROLYTE SECONDARY BATTERY

(71) Applicant: SANYO Electric Co., Ltd., Daito (JP)

(72) Inventors: Takao Tsuda, Osaka (JP); Takuya Shinomiya, Osaka (JP); Takamitsu Tashita, Tokushima (JP); Fumikazu Mizukoshi, Osaka (JP)

(73) Assignee: SANYO Electric Co., Ltd., Osaka (JP)

( * ) Notice: Subject to any disclaimer, the term of this patent is extended or adjusted under 35 U.S.C. 154(b) by 567 days.

(21) Appl. No.: 17/604,334

(22) PCT Filed: Apr. 14, 2020

(86) PCT No.: PCT/JP2020/016401
§ 371 (c)(1),
(2) Date: Oct. 15, 2021

(87) PCT Pub. No.: WO2020/218083
PCT Pub. Date: Oct. 29, 2020

(65) Prior Publication Data
US 2022/0216475 A1    Jul. 7, 2022

(30) Foreign Application Priority Data

Apr. 24, 2019  (JP) ................................. 2019-083098

(51) Int. Cl.
*H01M 4/583* (2010.01)
*H01M 4/36* (2006.01)
(Continued)

(52) U.S. Cl.
CPC .......... *H01M 4/583* (2013.01); *H01M 4/364* (2013.01); *H01M 4/622* (2013.01); *H01M 2004/027* (2013.01)

(58) Field of Classification Search
CPC ....... H01M 4/583; H01M 4/364; H01M 4/366
See application file for complete search history.

(56) References Cited

U.S. PATENT DOCUMENTS

| 5,677,082 A | 10/1997 | Greinke et al. |
| 6,998,192 B1 * | 2/2006 | Yumoto ............ H01M 10/0525 429/231.1 |

(Continued)

FOREIGN PATENT DOCUMENTS

| CN | 106463727 B | * | 3/2019 | ............. C01B 32/20 |
| CN | 106463767 B | * | 3/2019 | ........ H01M 10/0525 |

(Continued)

OTHER PUBLICATIONS

Machine translation of JP 2018-055952 (no date) (Year: 0000).*

(Continued)

*Primary Examiner* — Amanda C. Walke
(74) *Attorney, Agent, or Firm* — WHDA, LLP

(57) ABSTRACT

The purpose of the present disclosure is to provide a nonaqueous electrolyte secondary battery which is provided with a negative electrode mixture layer that exhibits excellent electrolyte absorbing properties. A nonaqueous electrolyte secondary battery according to one embodiment of the present disclosure is characterized by being provided with a negative electrode having a negative electrode collector and a negative electrode mixture layer that is provided on the surface of the negative electrode collector, and is also characterized in that: the negative electrode mixture layer contains graphite particles A and graphite particles B, which serve as a negative electrode active material, and a rubber binder which serves as a binding agent; the graphite particles A have an internal void fraction of 5% or less; the graphite particles B have an internal void fraction of from 8% to 20%; if the negative electrode mixture layer is divided into two halves in the thickness direction, the outer surface-side half contains more graphite particles A than the negative electrode collector-side half; and from 90% to 100% of the all rubber binder contained in the negative electrode mixture (Continued)

layer is contained in the negative electrode collector-side half.

3 Claims, 2 Drawing Sheets

(51) Int. Cl.
*H01M 4/62* (2006.01)
*H01M 4/02* (2006.01)

(56) References Cited

U.S. PATENT DOCUMENTS

| | | | |
|---|---|---|---|
| 10,439,221 B2* | 10/2019 | Choi | H01M 4/525 |
| 2011/0045354 A1* | 2/2011 | Takei | H01M 4/587 |
| | | | 241/30 |
| 2014/0377637 A1* | 12/2014 | Kim | H01M 4/131 |
| | | | 429/235 |
| 2018/0190985 A1 | 7/2018 | Choi et al. | |
| 2021/0159489 A1* | 5/2021 | Sugaya | H01M 4/366 |
| 2022/0131131 A1* | 4/2022 | Natsumeda | H01M 4/483 |

FOREIGN PATENT DOCUMENTS

| | | | | |
|---|---|---|---|---|
| JP | 9-320600 A | | 12/1997 | |
| JP | 2000-11997 A | | 1/2000 | |
| JP | 2011-9203 A | | 1/2011 | |
| JP | 2012-216537 A | | 11/2012 | |
| JP | 2014-67638 A | | 4/2014 | |
| JP | 2014067638 A | * | 4/2014 | |
| JP | 2018-55952 A | | 4/2018 | |
| JP | 2018-523912 A | | 8/2018 | |
| KR | 2016014539 A | * | 2/2016 | C01B 32/20 |
| WO | WO-2016006617 A1 | * | 1/2016 | C01B 32/20 |
| WO | 2019/239652 A1 | | 12/2019 | |
| WO | WO-2021059705 A1 | * | 4/2021 | H01M 10/0525 |

OTHER PUBLICATIONS

Machine translation of JP 2012-216537 (no date) (Year: 0000).*
Translation of written opinion (ETWOS) (no date) (Year: 0000).*
International Search Report dated Jun. 30, 2020, issued in counterpart International Application No. PCT/JP2020/016401. (3 pages).

* cited by examiner

NONAQUEOUS ELECTROLYTE SECONDARY BATTERY

TECHNICAL FIELD

The present disclosure relates to non-aqueous electrolyte secondary batteries.

BACKGROUND ART

A negative electrode mixture layer of a negative electrode of a non-aqueous electrolyte secondary battery includes a negative electrode active material and a binder such as a rubber binder. In recent years, to achieve high energy density, carbon materials such as graphite particles having a low internal porosity or a low internal void ratio are being used as a negative electrode active material.

Patent Document 1, for example, discloses a non-aqueous electrolyte secondary battery including, as a carbon material, compacted carbon having an internal porosity of 5% or less.

Further, Patent Document 2 discloses a non-aqueous electrolyte secondary battery including a carbon material containing a carbon material A having an internal porosity of 1% or more and 23% or less and a carbon material B having an internal porosity of 23% or more and 40% or less.

CITATION LIST

Patent Literature

PATENT LITERATURE 1: Japanese Unexamined Patent Application Publication No. Hei 9-320600
PATENT LITERATURE 2: Japanese Unexamined Patent Application Publication No. 2014-67638

SUMMARY

Technical Problem

For non-aqueous electrolyte secondary batteries used as a power source for electric vehicles (EV), for example, which are often charged and discharged at high rates, inhibition of deterioration of the rapid charge and discharge cycle characteristics is demanded. One of factors causing deterioration of the rapid charge and discharge cycle characteristics is a failure to absorb an electrolyte from a negative electrode which has been expanded at the time of charge, into the negative electrode immediately during discharge. Neither Patent Document 1 nor Patent Document 2 consider anything about absorption of an electrolyte into a negative electrode.

It is therefore an object of the present disclosure to provide a non-aqueous electrolyte secondary battery including a negative electrode mixture layer with high electrolyte-absorptivity.

Solution to Problem

In accordance with an aspect of the present disclosure, a non-aqueous electrolyte secondary battery includes a negative electrode including a negative electrode collector and a negative electrode mixture layer disposed on a surface of the negative electrode collector. The negative electrode mixture layer contains graphite particles A and graphite particles B as a negative electrode active material and a rubber binder as a binder. The graphite particles A have an internal porosity of 5% or less, and the graphite particles B have an internal porosity of 8% to 20%. The negative electrode mixture layer includes two equally divided half regions in a thickness direction of the negative electrode mixture layer, and the graphite particles A are contained in a half region of the negative electrode mixture layer adjacent to an outer surface of the negative electrode mixture layer in a greater amount than in a half region of the negative electrode mixture layer adjacent to the negative electrode collector. The rubber binder is contained in the half region adjacent to the negative electrode collector in an amount of 90 mass % to 100 mass % of all of the rubber binder contained in the negative electrode mixture layer.

Advantageous Effects of Invention

The non-aqueous electrolyte secondary battery according to the present disclosure includes a negative electrode mixture layer with high electrolyte absorptivity, and enables inhibition of deterioration of rapid charge and discharge cycle characteristics.

DESCRIPTION OF EMBODIMENTS

The present inventors, through their diligent study, have revealed that, to increase electrolyte-absorptivity of a negative electrode mixture layer, a negative electrode mixture layer including graphite particles having a low internal porosity and graphite particles having a high internal porosity such that the graphite particles having a low internal porosity are disposed in a portion of the negative electrode mixture layer adjacent to an outer surface in a greater amount than in a portion of the negative electrode mixture layer adjacent to the negative electrode collector and including a rubber binder in the portion of the negative electrode mixture layer adjacent to the negative electrode collector, is extremely effective, and thus conceived of a non-aqueous electrolyte secondary battery having the following aspects.

In accordance with an aspect of the present disclosure, a non-aqueous electrolyte secondary battery includes a negative electrode including a negative electrode collector, and a negative electrode mixture layer disposed on a surface of the negative electrode collector. The negative electrode mixture layer contains graphite particles A and graphite particles B as a negative electrode active material and a rubber binder as a binder. The graphite particles A have an internal porosity of 5% or less, and the graphite particles B have an internal porosity of 8% to 20%. The negative electrode mixture layer includes two equally divided half regions in a thickness direction of the negative electrode mixture layer, and the graphite particles A are contained in a half region of the negative electrode mixture layer adjacent to an outer surface of the negative electrode mixture layer in a greater amount than in a half region of the negative electrode mixture layer adjacent to the negative electrode collector. The rubber binder is contained in the half region adjacent to the negative electrode collector in an amount of 90 mass % to 100 mass % of all of the rubber binder contained in the negative electrode mixture layer.

An example embodiment will be described in detail below with reference to the drawings. In the following description, specific shapes, materials, numerical values, and directions, for example, are only examples for ease of understanding of the disclosure, and may be modified in accordance with the specification of a non-aqueous electrolyte secondary battery. If the following description includes a plurality of embodiments and modification examples, it is initially assumed that features thereof are to be used in combinations as appropriate.

Figure 1:
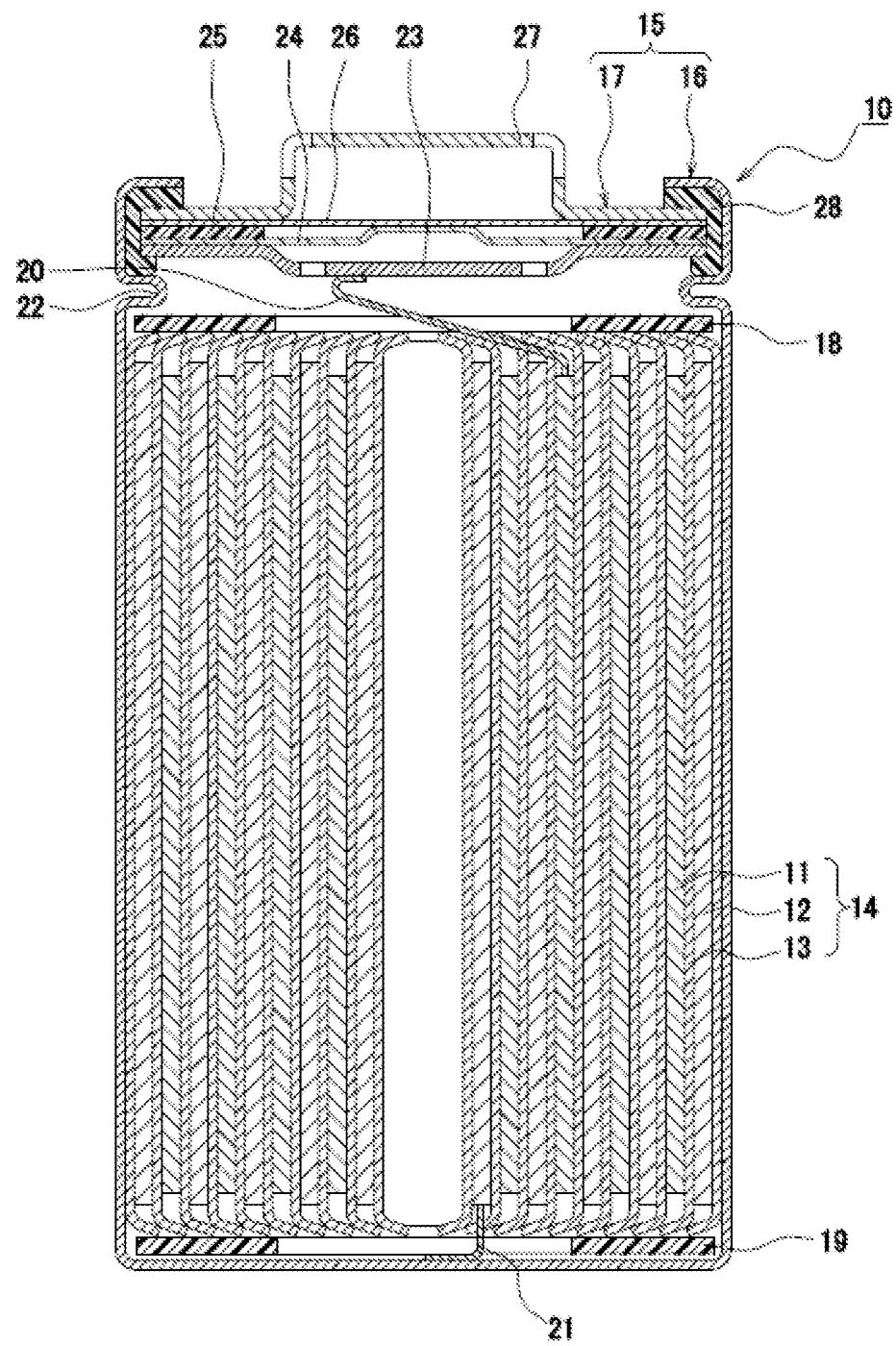
FIG. 1 is an axial cross sectional view of a non-aqueous electrolyte secondary battery according to an example embodiment.

FIG. 1 is an axial cross-sectional view of a non-aqueous electrolyte secondary battery 10 according to an example embodiment. The non-aqueous electrolyte secondary battery 10 illustrated in FIG. 1 includes an electrode assembly 14 and a non-aqueous electrolyte (not shown) received in a battery case 15. The electrode assembly 14 has a wound configuration in which a positive electrode 11 and a negative electrode 12 are wound with a separator 13 therebetween. The electrode assembly 14 may have a configuration other than the wound configuration, such as a laminate electrode assembly 14 including the positive electrode 11 and the negative electrode 12 alternately stacked via the separator. Examples of a non-aqueous solvent (organic solvent) of the non-aqueous electrolyte include carbonates, lactones, ethers, ketones, esters, and mixtures of two or more of these solvents. For example, cyclic carbonates such as ethylene carbonate (EC), propylene carbonate (PC), and butylene carbonate, chain carbonates such as dimethyl carbonate (DMC), ethyl methyl carbonate, diethyl carbonate, and a mixture solvents of cyclic carbonates and chain carbonates, for example, may be used. Examples of electrolyte salts of the non-aqueous electrolyte include $LiPF_6$, $LiBF_4$, $LiCF_3SO_3$, and mixtures of these. A dissolved amount of the electrolyte salt with respect to the non-aqueous solvent may be 0.5 to 2.0 mol/L, for example. In the following description, for ease of description, a direction toward a sealing assembly 17 of the battery case 15 indicates upward, and a direction toward the bottom of an exterior package 16 indicates downward.

The battery case 15 includes the exterior package 16 and a sealing assembly 17 that closes an opening of the exterior package 16. Insulating plates 18 and 19 are disposed on top and bottom of the electrode assembly 14, respectively. A positive electrode lead 20 extends through a through hole in the insulating plate 18 toward the sealing assembly 17 and is welded on an underside of a filter 23 that is a bottom plate of the sealing assembly 17. In the non-aqueous electrolyte secondary battery 10, a cap 27 that is a top plate of the sealing assembly 17 electrically connected to the filter 23 serves as a positive electrode terminal. Meanwhile, a negative electrode lead 21 extends through a through hole in the insulating plate 19 towards a bottom of the exterior package 16 and is welded to an inner face of the bottom of the exterior package 16. In the non-aqueous electrolyte secondary battery 10, the exterior package 16 serves as a negative electrode terminal. In a configuration in which the negative electrode lead 21 is disposed near a wound outer end, the negative electrode lead 21 passes external to the insulating plate 19 to extend toward the bottom of the exterior package 16 and is welded on the inner face of the exterior package 16. The battery case 15 may be a metal external case having a shape of a cylinder, a rectangle, a coin, a button, or the like, or a pouch exterior package made of resin sheets and metal sheets that are laminated, for example.

The exterior package 16 is a cylindrical metal exterior can with a bottom. A gasket 28 is disposed between the exterior package 16 and the sealing assembly 17 to secure airtightness within the battery case 15. The exterior package 16 includes a projecting portion 22 formed, for example, by pressing the side face thereof inward to support the sealing assembly 17. The projecting portion 22 is preferably formed annularly along the circumferential direction of the exterior package 16 to support the sealing assembly 17 on its upper face.

The sealing assembly 17 include the filter 23, a lower valve element 24, an insulating member 25, an upper valve element 26, and the cap 27 that are stacked in sequence from a direction where the electrode assembly 14 is located. The components of the sealing assembly 17 have, for example, either a disc shape or a ring shape and are, except for the insulating member 25, electrically connected to each other. The lower valve element 24 and the upper valve element 26 are connected to each other at their center portions, and the insulating member 25 is interposed between their peripheral portions. In response to an increase in internal pressure of the battery due to abnormal heat generation, the lower valve element 24 breaks to deform and push the upper valve element 26 toward the cap 27, resulting in an interruption of the current path between the lower valve element 24 and the upper valve element 26. In response to a further increase in internal pressure, the upper valve element 26 breaks, letting gas escape through an opening of the cap 27.

The positive electrode 11, the negative electrode 12, and the separator 13 of the electrode assembly 14, particularly a negative electrode mixture layer 42 of the negative electrode 12 will be described in detail below.

[Negative Electrode]

Figure 2:
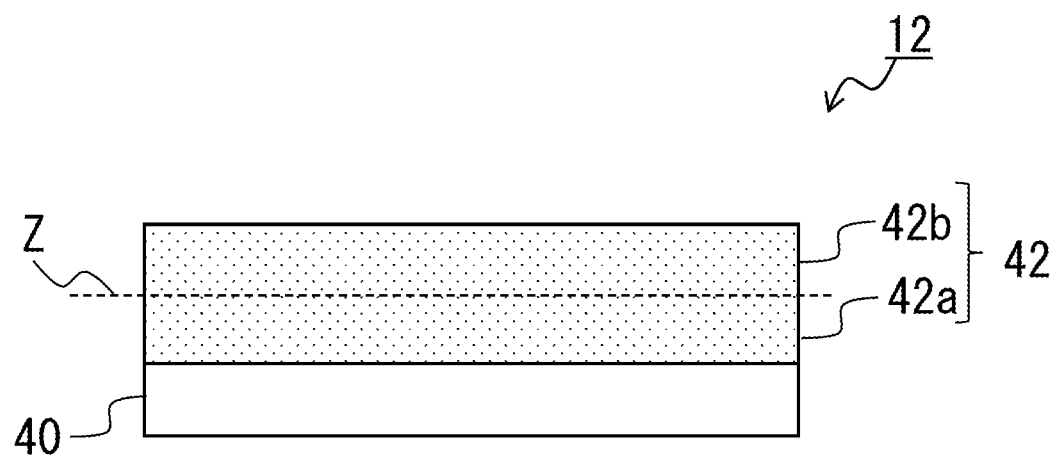
FIG. 2 is a cross sectional view of a negative electrode according to an example embodiment.

FIG. 2 is a cross sectional view of the negative electrode 12 according to an example embodiment. The negative electrode 12 includes a negative electrode collector 40 and a negative electrode mixture layer 42 disposed on a surface of the negative electrode collector 40. The negative electrode collector 40 may be a foil of metal, such as copper, that is stable within a potential range of the negative electrode 12 or a film including such metal on its surface layer. The negative electrode mixture layer 42 includes two half regions 42a and 42b formed by equally dividing the width of the negative electrode mixture layer 42 into halves at the center Z. The half region 42a is closer to the negative electrode collector 40 and the half region 42b is farther from the negative electrode collector 40 and closer to an outer surface of the negative electrode mixture layer 42. The negative electrode mixture layer 42 contains graphite particles 30 as negative electrode active materials and a rubber binder as a binder.

The rubber binder has a repeating molecular structure of double bonds and single bonds, and may be styrene-butadiene rubber (SBR), nitrile butadiene rubber (NBR), and modified forms thereof, for example. The average primary particle size of the rubber binder is preferably 120 to 250 nm, and more preferably 150 to 230 nm. The negative electrode mixture layer 42 may further include, as a binder, fluorine-containing resins such as polytetrafluoroethylene (PTFE) and polyvinylidene fluoride (PVdF), polyacrylonitrile (PAN), polyimides, acrylic resins, and polyolefins, for example. The negative electrode mixture layer 42 may also include carboxymethylcellulose (CMC) or salt thereof, polyacrylic acid (PAA) or salt thereof, and polyvinyl alcohol (PVA), for example. The CMC or salt thereof functions as a thickener that regulates a negative electrode active material slurry within an appropriate viscosity range, and also functions as a binder. These binders may be used alone, of two or more of the binders are used in combinations.

The rubber binder is contained in the halt region 42a adjacent to the negative electrode collector in an amount of 90% to 100% of the total amount of the rubber binder contained in the negative electrode mixture layer 42. A large amount of rubber binder contained in the half region 42a adjacent to the negative electrode collector enhances adhesion between the negative electrode collector 40 and the negative electrode mixture layer 42. Meanwhile, a small amount of rubber binder contained in the half region 42b adjacent to the outer surface accelerates absorption of the electrolyte by the negative electrode mixture layer 42. This configuration enables inhibition of deterioration of the rapid charge and discharge cycle characteristics. As the rubber binder disperses across the half region 42a adjacent to the negative electrode collector and the half region 42b adjacent to the outer surface of the negative electrode mixture layer 42 during production of the negative electrode mixture layer 42 as will be described below, distribution of the rubber binder in the negative electrode mixture layer 42 after drying differs from the distribution thereof at the time of preparation. The content of the rubber binder is obtained according to the following procedure.

<Measuring Method of Rubber Binder Content>

(1) A cross section of the negative electrode mixture layer 42 is exposed, for example, by, after cutting a portion of the negative electrode 12, machining the negative electrode 12 with an ion milling system (e.g., IM4000PLUS of Hitachi High-Tech).

(2) An osmium marker of osmium tetroxide, for example, is made to react with a double bond of the rubber binder exposed on the cross section of the negative electrode mixture layer 42 for fixation.

(3) For the cross section of the negative electrode mixture layer 42, EDX (Energy Dispersive X-ray Spectroscopy) associated with a scanning electron microscope is used to capture an image of a mapped marker.

(4) The content of the rubber binder contained in each of the half region 42a adjacent to the negative electrode collector and the half region 42b adjacent to the outer surface of the negative electrode mixture layer 42 is calculated from the above image, to determine the ratio of the rubber binder contained in the half region 42a adjacent to the negative electrode collector. The content of the rubber binder is determined by averaging 10 measurements.

Figure 3:
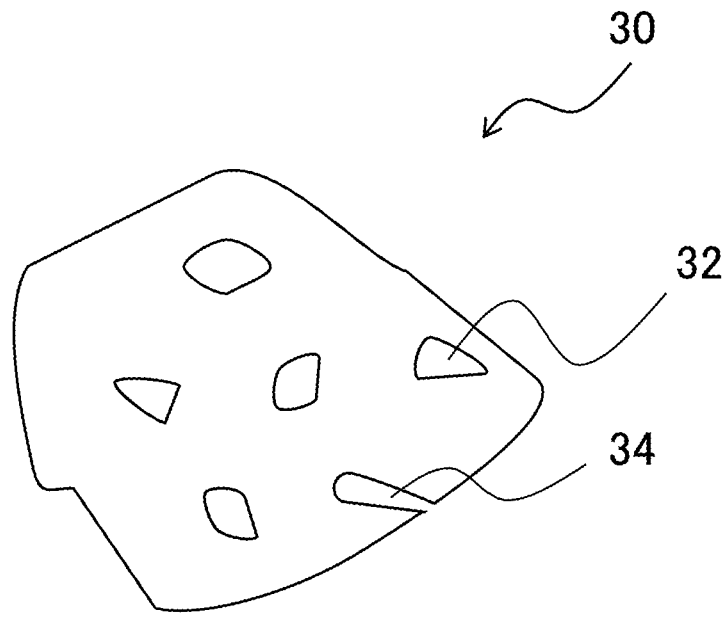
FIG. 3 is a cross sectional view of a graphite particle according to an example embodiment.

Referring now to FIG. 3, the graphite particles 30 will be described. FIG. 3 is a cross sectional view of a graphite particle 30 contained in the negative electrode mixture layer 42. The graphite particle 30 includes, in a cross sectional view of the graphite particle 30, closed voids 32 that are not connected to the surface of the particle through the interior of the particle (hereinafter referred to as "internal voids 32") and voids 34 connected to the surface of the particle through the interior of the particle (hereinafter referred to as "external voids 34").

The graphite particles 30 include a graphite particle A having an internal porosity or an internal void ratio of 5% or less and a graphite particle B having an internal porosity of 8% to 20%. While the internal porosity of the graphite particle A may be any value that is 5% or less in terms of inhibition of deterioration of the rapid charge and discharge cycle characteristics, it is preferably 1% to 5%, and is more preferably 3% to 5%. While the internal porosity of the graphite particle B may also be any value that is 8% to 20% in terms of inhibition of deterioration of the rapid charge and discharge cycle characteristics, it is preferably 10% to 18%, and is more preferably 12% to 16%. Here, the internal porosity of the graphite particle 30 is a two-dimensional value obtained from a ratio of the area of the internal voids 32 in the graphite particle 30 with respect to the cross sectional area of the graphite particle 30. The internal porosity of the graphite particle 30 is determined according to the following procedure.

<Measuring Method of Internal Porosity>

(1) Similar to the measuring method for the content of a rubber binder, an ion milling system, for example, is used to expose a cross section of the negative electrode mixture layer 42.

(2) A scanning electron microscope is used to capture a backscattered electronic image of the exposed cross section of the negative electrode mixture layer 42. The magnification rate in imaging a backscattered electron image is 3000 to 5000.

(3) The cross sectional image thus obtained is incorporated into a computer and is processed for binarization using an image analyzing software (e.g., ImageJ of US National Institute of Health), to obtain a converted binarized image including particle cross sections within in the cross sectional image in black color and voids on the particle cross sections in white color.

(4) The graphite particles A and B having a particle size of 5 μm to 50 μm are selected from the binarized image, and the area of the cross section of the graphite particle and the area of the internal voids 32 on the cross section of the graphite particle are calculated. Here, the area of the cross section of the graphite particle refers to the area of a region enclosed by the outer circumference of the graphite particle 30, that is, the area of a whole portion of the cross section of the graphite particle 30. For a void having a width of 3 μm or less among the voids on the cross section of the graphite particle, it is sometimes difficult to determine whether such a void is an internal void 32 or an external void 34 in image analysis. Therefore, a void having a width of 3 μm or less may be regarded as an internal void 32. Based on the area of the cross section of the graphite particle and the area of the internal voids 32 on the cross section of the graphite particle, the internal porosity of the graphite particle 30 (the area of internal voids 32 on the graphite particle cross section×100/the area of the graphite particle cross section) is calculated. The internal porosity of each of the graphite particles A and B is determined by averaging 10 calculated values for each of the graphite particles A and B.

The graphite particles A and B are produced, for example, as follows:

<Graphite Particles A Having Internal Porosity of 5% or Less>

For example, coke (a precursor) serving as a primary material is pulverized into particles having a predetermined size, and, after aggregating the pulverized coke particles using an aggregating agent, the coke aggregate is baked at temperatures of 2600° C. or higher for graphitization and is then screened to form graphite particles A having a desired size. Here, the internal porosity is adjustable to 5% or less by regulating the particle size of the pulverized precursors or the particle size of the aggregated precursors, for example. Preferably, the average particle size (median diameter D50) of the pulverized precursor is within a range of 12 μm to 25 μm, for example. To reduce the internal porosity within the range of 5% or less, it is preferable to increase the particle size of the pulverized precursors.

<Graphite Particles B Having Internal Porosity of 8% to 20%>

For example, coke (a precursor) serving as a primary material is pulverized into a predetermined size, and, after aggregating the pulverized coke particles using an aggregating agent, an aggregate of coke is further pressed into a block shape and baked at temperatures of 2600° C. or higher for graphitization. The graphitized block of molded article is pulverized and screened, thereby forming graphite particles B having a desired size. Here, the internal porosity is adjustable to 8% to 20% by regulating an amount of volatile components to be added to the block-shape molded article. An aggregating agent to be added to the coke (precursor), which partially volatilizes during baking, may be used as volatile components. Examples of such an aggregating agent include pitch.

While the graphite particles A and B used in the present embodiment may be natural graphite, artificial graphite, or any other graphite, in terms of adjustability of the internal porosity, the artificial graphite is preferable. The inter-planar spacing ($d_{002}$) of (002) planes of the graphite particles A and B used in the present embodiment according to X-ray wide angle diffraction is preferably 0.3354 nm or more, for example, and more preferably 0.3357 nm or more, and also is preferably less than 0.340 nm, and more preferably 0.338 nm or less. The crystallite size (Lc(002)) of the graphite particles A and B used in the present embodiment, which is determined according to the X-ray diffraction, is preferably 5 nm or more, for example, and more preferably 10 nm or more, and also is preferably 300 nm or less and more preferably 200 nm or less. The inter-planar spacing ($d_{002}$) and the crystallite size (Lc(002)) that satisfy the above range tend to increase the battery capacity of the non-aqueous electrolyte secondary battery 10 as compared to those that do not fall within the above range.

In the present embodiment, the negative electrode mixture layer 42 illustrated in FIG. 2 includes two equally divided half regions in its thickness direction, and the graphite particles A are contained in the half region 42b of the negative electrode mixture layer 42 adjacent to the outer surface in a greater amount than in the half region 42a of the negative electrode mixture layer 42 adjacent to the negative electrode collector. Inclusion of a large amount of graphite particles A having a lower internal porosity in the half region 42b adjacent to the outer surface results in an increase in voids between active material particles that serve as absorbing paths of electrolyte in the half region 42b adjacent to the outer surface, as compared when the graphite particles A are uniformly distributed in the negative electrode mixture layer 42. This allows rapid absorption of the electrolyte into the negative electrode mixture layer 42. In addition, inclusion of a large amount of graphite particles A in the half region 42b adjacent to the outer surface results in inclusion of a large amount of graphite particles B having a higher internal porosity in the half region 42a adjacent to the negative electrode collector. This leads to a decrease in voids between active material particles in the half region 42a adjacent to the negative electrode collector, preventing diffusion of the rubber binder from the half region 42a adjacent to the negative electrode collector to the half region 42b adjacent to the outer surface.

While in the present embodiment, it is only necessary that the graphite particles A are contained in the half region 42b adjacent to the outer surface in a greater amount than in the half region 42a adjacent to the negative electrode collector, to further inhibit deterioration of the rapid charge and discharge cycle characteristics, the ratio of the graphite particles A and the graphite particles B in the half region 42b adjacent to the outer surface, by a mass ratio, is preferably 60:40 to 100:0, and 100:0 is more preferable. To further inhibit deterioration of the rapid charge and discharge cycle characteristics, the ratio of the graphite particles A and the graphite particles B in the half region 42a adjacent to the negative electrode collector, by a mass ratio, is 40:60 to 0:100, and 0:100 is more preferable.

A method for producing the negative electrode mixture layer 42 including the graphite particles A in a greater amount in the half region 42b adjacent to the outer surface than in the half region 42a adjacent to the negative electrode collector will be described. For example, a negative electrode active material containing the graphite particles B (and graphite particles A as required), a binder, and a solvent such as water, are mixed to first formulate a negative electrode mixture slurry for a region adjacent to the negative electrode collector. Further, a negative electrode active material containing the graphite particles A in a greater amount than the amount in the negative electrode mixture slurry for a region adjacent to the negative electrode collector (and the graphite particles B as required), a binder, and a solvent such as water, are mixed to separately formulate a negative electrode mixture slurry for a region adjacent to the outer surface. Then, after the negative electrode mixture slurry for a region adjacent to the negative electrode collector is applied to each of opposite surfaces of the negative electrode collector 40, the negative electrode mixture slurry for a region adjacent to the outer surface is applied to the coating of the negative electrode mixture slurry for a region adjacent to the negative electrode collector on each surface and then the whole coating is dried, so that the negative electrode mixture layer 42 can be formed. While in the above method, the negative electrode mixture slurry for a region adjacent to the outer surface is applied before the negative electrode mixture slurry for a region adjacent to the negative electrode collector has been dried, the negative electrode mixture slurry for a region adjacent to the outer surface may be applied after the negative electrode mixture slurry for a region adjacent to the negative electrode collector is dried. While the negative electrode mixture slurry for a region adjacent to the negative electrode collector and the negative electrode mixture slurry for a region adjacent to the outer surface are preferably applied to have an equal thickness, they may have different coating thicknesses. More specifically, the negative electrode mixture slurry for a region adjacent to the negative electrode collector may be partially contained in the half region 42b adjacent to the outer surface, or the negative electrode mixture slurry for a region adjacent to the outer surface may be partially contained in the half region 42a adjacent to the negative electrode collector.

The negative electrode active material may contain materials that may reversibly occlude and release lithium ions, such as Si-based materials, other than the graphite particles A and B used in the present embodiment. Examples of the Si-based materials include, for example, Si, an alloy containing Si, silicon oxide such as $SiO_x$ (where x is 0.8 to 1.6). While the Si-based material is a negative electrode material that enables further increase in the battery capacity as compared to the graphite particle 30, the Si-based materials are disadvantageous in terms of the rapid charge and discharge cycle characteristics due to their large cubical expansion associated with charge and discharge. In consideration of an increase in the battery capacity and inhibition of deterioration of the rapid charge and discharge cycle characteristics, for example, the content of the Si-based material is, for example, preferably 1 mass % to 10 mass %, and more preferably 3 mass % to 7 mass %, with respect to the mass of the negative electrode active material.

Examples of other materials that can reversibly occlude and release lithium ions include metals that alloy with lithium, such as tin (Sn), or an alloy including a metal element such as Sn and oxides, for example. The negative electrode active material may include the example materials described above in an amount of preferably 10 mass % or less with respect to the mass of the negative electrode active material, for example.

[Positive Electrode]

The positive electrode 11 includes a positive electrode collector such as a metal foil and a positive electrode mixture layer disposed on the positive electrode collector. Examples of the positive electrode collector include a foil of metal that is stable in a potential range of the positive electrode 11, such as aluminum, and a film having such metal disposed on its surface layer. The positive electrode mixture layer contains, for example, a positive electrode active material, a binder, and a conductive material.

The positive electrode 11 can be prepared by, for example, applying a positive electrode mixture slurry containing a positive electrode active material, a binder, and a conductive material, to the positive electrode collector and drying the coating to form a positive electrode mixture layer, and then rolling the positive electrode mixture layer.

Examples of the positive electrode active material include lithium transition metal composite oxide containing a transition metal element such as Co, Mn, and Ni, for example. The lithium transition metal composite oxide is, for example, $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, or $Li_2MPO_4F$ (M is at least one of Na, Mg, Sc, Y, Mn, Fe, Co, Ni, Cu, Zn, Al, Cr, Pb, Sb, or B, $0<x\leq1.2$, $0<y\leq0.9$, $2.0\leq z\leq2.3$), which may be used alone or in combinations. To allow high capacity of the non-aqueous electrolyte secondary battery 10, the positive electrode active material preferably contains lithium-nickel composite oxide such as $Li_xNiO_2$, $Li_xCo_yNi_{1-y}O_2$, $Li_xNi_{1-y}M_yO_z$ (M is at least one of Na, Mg, Sc, Y, Mn, Fe, Co, Ni, Cu, Zn, Al, Cr, Pb, Sb, or B, $0<x\leq1.2$, $0<y\leq0.9$, $2.0\leq z\leq2.3$), for example.

Examples of the conductive material include carbon particles such as carbon black (CB), acetylene black (AB), Ketjenblack, and graphite, which may be used alone or in combinations.

Examples of the binder include, for example, fluorine-containing resins such as polytetrafluoroethylene (PTFE) and polyvinylidene fluoride (PVdF), polyacrylonitrile (PAN), polyimide resins, acrylic resins, polyolefins, which may be used alone or in combinations.

[Separator]

The separator 13 is an ion-permeable and insulating porous sheet, for example. Examples of the porous sheet include a microporous thin film, woven fabric, and nonwoven fabric. Suitable examples of materials for the separator 13 include olefin resins such as polyethylene and polypropylenes, and cellulose. The separator 13 may have either a single-layer structure or a multilayer structure. The separator 13 may have a laminate structure including a cellulose fiber layer and a thermoplastic resin fiber layer such as olefin resins. The separator 13 may also be a multi-layer separator 13 including a polyethylene layer and a polypropylene layer, or may include a surface coated with a material such as an aramid resin and ceramic, for example.

EXAMPLES

The present disclosure will be further described with examples below; however, the present disclosure is not limited to these examples.

Example 1

[Preparation of Positive Electrode]

As a positive electrode active material, an aluminum-containing lithium nickel cobalt oxide ($LiNi_{0.88}Co_{0.09}Al_{0.03}O_2$) was used. Specifically, 100 parts by mass of a positive electrode active material, 1 part of mass of acetylene black (AB) as a conductive material, and 0.9 parts by mass of polyvinylidene fluoride (PVdF) were mixed, and a proper amount of N-methyl-2-pyrrolidone (NMP) was further added to the mixture to prepare a positive electrode mixture slurry. Subsequently, the positive electrode mixture slurry was applied onto each of opposite surfaces of the positive electrode collector formed of an aluminum foil (having a thickness of 15 μm) by doctor blading, for example. After drying the coating, the coating is rolled by a pressure roll to form a positive electrode having a positive electrode mixture layer on each of the opposite surfaces of the positive electrode collector.

[Preparation of Graphite Particles A]

Coke was pulverized into particles having an average particle size (median diameter D50) of 12 μm. Pitch was added to the pulverized coke as a binder to allow the coke to aggregate into particles having an average particle size (median diameter D50) of 17 μm. After the aggregates were baked at 2800° C. for graphitization, the aggregates were screened with a 250 mesh screen, and thus graphite particles A having an average particle size (median diameter D50) of 23 μm were formed.

[Preparation of Graphite Particles B]

Coke was pulverized into particles having an average particle size (median diameter D50) of 15 μm. After pitch was added to the pulverized coke as a binder to allow the coke to aggregate, isotropic pressure was further applied to the aggregates to prepare block-shape molded articles having a density of 1.6 g/cm³ to 1.9 g/cm³. After the block molded articles were baked at 2800° C. for graphitization, the block molded articles were screened with a 250 mesh screen, and thus graphite particles B having an average particle size (median diameter D50) of 23 μm were formed.

[Preparation of Negative Electrode]

A negative electrode active material A to be contained in a half region of the negative electrode mixture layer close of the outer surface was prepared by mixing 100 parts by mass of the graphite particles A and 5 parts by mass of SiO. The negative electrode active material A, carboxymethylcellulose (CMC), and polyacrylic acid (PAA) were mixed in a mass ratio of 100:1:1 to formulate a negative electrode mixture slurry for a region adjacent to the outer surface. Further, 100 parts by mass of the graphite particles B and 5 parts by mass of SiO were mixed to form a negative electrode active material B to be contained in a half region of the negative electrode mixture layer adjacent to the negative electrode collector. This negative electrode active material B, carboxymethylcellulose (CMC), polyacrylic acid (PAA), and styrene-butadiene rubber (SBR) were mixed in a mass ratio of 100:1:1:1 to formulate a negative electrode mixture slurry for a region adjacent to the negative electrode collector. Here, the average primary particle size of SBR was 150 nm.

The negative electrode mixture slurry for a region adjacent to the negative electrode collector was applied to each of opposite surfaces of the negative electrode collector formed of a copper foil by doctor blading, for example. After drying the coating, the negative electrode mixture slurry for a region adjacent to the outer surface was applied to the coating and dried, and then the coating was rolled by a pressure roll to form a negative electrode having a negative electrode mixture layer on each of the opposite surfaces of the negative electrode collector. Thus, the mass ratio of the graphite particles A and the graphite particles B is 100:0 in the half region of the negative electrode mixture layer adjacent to the outer surface, and the mass ratio of the graphite particles A and the graphite particles B is 0:100 in the half region of the negative electrode mixture layer adjacent to the outer surface. The internal porosities of the graphite particles A and B in the prepared negative electrode were 3% and 15%, respectively.

The mixing ratio of the rubber binder (rubber binder in the negative electrode mixture slurry for a region adjacent to the outer surface:rubber binder in the negative electrode mixture slurry for a region adjacent to negative electrode collector) was 0:100 in a mass ratio. The negative electrode mixture slurry for a region adjacent to the negative electrode collector and the negative electrode mixture slurry for a region adjacent to the outer surface were applied to have an equal coating thickness. However, as the rubber binder diffused during drying, for example, in producing the negative electrode mixture layer, the ratio of the rubber binder present after drying (rubber binder in the half region of the negative electrode mixture layer adjacent to the outer surface:rubber binder in the half region of the negative electrode mixture layer adjacent to the negative electrode collector), in a mass ratio, was 7:93.

Example 2

A negative electrode was prepared in a similar manner to EXAMPLE 1 except that 60 parts by mass of the graphite particles A, 40 parts by mass of the graphite particles B, and 5 parts by mass of SiO were mixed to form the negative electrode active material A, and 40 parts by mass of the graphite particles A, 60 parts by mass of the graphite particles B, and 5 parts by mass of SiO were mixed to form the negative electrode active material B. Thus, the mass ratio of graphite particles A:graphite particles B in the half region of the negative electrode mixture layer adjacent to the outer surface is 60:40, and the mass ratio of graphite particles A:graphite particles B in the half region of the negative electrode mixture layer adjacent to the negative electrode collector is 40:60. Further, the ratio of the rubber binder after drying (rubber binder in the half region of the negative electrode mixture layer adjacent to the outer surface:rubber binder in the half region of the negative electrode mixture layer adjacent to the negative electrode collector), in a mass ratio, was 9:91.

Comparative Example 1

First, 50 parts by mass of the graphite particles A, 50 parts by mass of the graphite particles B, and 5 parts by mass of SiO were mixed to form a negative electrode active material C to be contained in the entire region of the negative electrode mixture layer. This negative electrode active material C, carboxymethylcellulose (CMC), polyacrylic acid (PAA), and styrene-butadiene rubber (SBR) were mixed in a mass ratio of 100:1:1:1 to formulate a negative electrode mixture slurry. This negative electrode mixture slurry was applied to each of opposite surfaces of the negative electrode collector formed of a copper foil by doctor blading. After drying the coating, the coating was rolled by a pressure roll to form a negative electrode having a negative electrode active material layer on each of the opposite surfaces of the negative electrode collector. Specifically, the mass ratio of the graphite particles A and the graphite particles B is 50:50 in the half region of the negative electrode active material layer adjacent to the outer surface, and the mass ratio of the graphite particles A and the graphite particles B is also 50:50 in the half region of the negative electrode active material layer adjacent to the outer surface. The ratio of the rubber binder after drying (rubber binder in the half region of the negative electrode mixture layer adjacent to the outer surface:rubber binder in the half region of the negative electrode mixture layer adjacent to the negative electrode collector), in a mass ratio, was 48:52.

Comparative Example 2

The negative electrode active material A that is the same as that used in EXAMPLE 1, carboxylmethylcellulose (CMC), polyacrylic acid (PAA), and styrene-butadiene rubber (SBR) were mixed in a mass ratio 100:1:1:0.5 to prepare a negative electrode mixture slurry for a portion adjacent to the outer surface. Further, the negative electrode active material B that is the same as that used in EXAMPLE 1, carboxylmethylcellulose (CMC), polyacrylic acid (PAA), and styrene-butadiene rubber (SBR) were mixed at a mass ratio of 100:1:1:0.5 to prepare a negative electrode mixture slurry for a portion adjacent to the negative electrode collector. Thereafter, a negative electrode was prepared in a manner similar to EXAMPLE 1 using the negative electrode mixture slurry for a portion adjacent to the outer surface and the negative electrode mixture slurry for a portion adjacent to the negative electrode collector. As such, the mass ratio of graphite particles A:graphite particles B in the half region of the negative electrode mixture layer adjacent to the outer surface is 100:0, and the mass ratio of graphite particles A:graphite particles B in the half region of the negative electrode mixture layer adjacent to the negative electrode mixture layer is 0:100. The ratio of the rubber binder after drying (rubber binder in the half region of the negative electrode mixture layer adjacent to the outer surface:rubber binder in the half region of the negative electrode mixture layer adjacent to the negative electrode collector), in a mass ratio, was 43:57.

Comparative Example 3

A negative electrode was prepared in a manner similar to EXAMPLE 1 except that the negative electrode active material C that is used in COMPARATIVE EXAMPLE 1 was used in place of the negative electrode active material A and the negative electrode active material B. More specifically, the mass ratio of graphite particles A:graphite particles B in the half region of the negative electrode mixture layer adjacent to the outer surface is 50:50, and the mass ratio of graphite particles A:graphite particles B in the half region of the negative electrode mixture layer adjacent to the negative electrode mixture layer is also 50:50. The ratio of the rubber binder after drying (rubber binder in the half region of the negative electrode mixture layer adjacent to the outer surface:rubber binder in the half region of the negative electrode mixture layer adjacent to the negative electrode collector), in a mass ratio, was 9:91.

[Measurement of Liquid Absorbing Time]

The negative electrode in each of EXAMPLES and COMPARATIVE EXAMPLES was dried for 10 hours in a thermostatic oven heated to 200° C. under nitrogen atmosphere and was then cut to a size of 2 cm×5 cm, to thereby prepare a sample. Then, 1.5 μml of polypropylene carbonate (PC) was vertically dropped down to each sample, and the time taken until the PC is absorbed into the sample was measured by visual inspection. The measurements were performed 6 times for each sample, and the average value was obtained as a liquid absorbing time.

Table 1 shows the liquid absorbing time for the non-aqueous electrolyte secondary battery in each of EXAMPLES and COMPARATIVE EXAMPLES. Each of the liquid absorbing time shown in Table 1 is a relative time with respect to the liquid absorbing time in EXAMPLE 1 which is 100. Shorter the liquid absorbing time, swifter the change of the electrolyte in the negative electrode mixture layer, which accelerates absorption of the electrolyte discharged from the negative electrode mixture layer during charging into the negative electrode mixture layer, thereby inhibiting deterioration of the rapid charge and discharge cycle characteristics.

TABLE 1

| | Graphite ratio | | Rubber binder (mass ratio) | | | | Liquid absorbing time (relative value) |
| | | | Formulation ratio | | Ratio after drying | | |
| | (graphite A:graphite B) | | Adjacent to outer surface | Adjacent to collector | Adjacent to outer surface | Adjacent to collector | |
|---|---|---|---|---|---|---|---|
| | Adjacent to outer surface | Adjacent to collector | | | | | |
| EXAMPLE 1 | 100:0 | 0:100 | 0 | 100 | 7 | 93 | 100 |
| EXAMPLE 2 | 60:40 | 40:60 | 0 | 100 | 9 | 91 | 129 |
| COMPARATIVE EXAMPLE 1 | 50:50 | 50:50 | 50 | 50 | 48 | 52 | 222 |
| COMPARATIVE EXAMPLE 2 | 100:0 | 0:100 | 50 | 50 | 43 | 57 | 177 |
| COMPARATIVE EXAMPLE 3 | 50:50 | 50:50 | 0 | 100 | 9 | 91 | 168 |

As can be understood from Table 1, the liquid absorbing times in EXAMPLES 1 and 2 are both shorter than those in COMPARATIVE EXAMPLES 1 to 3. Note that, in COMPARATIVE EXAMPLE 2 and COMPARATIVE EXAMPLE 3 in which either one of the graphite ratio or the mass ratio of the rubber binder was changed from those of COMPARATIVE EXAMPLE 1, the liquid absorbing times are reduced to 80% and 76%, respectively, of that of COMPARATIVE EXAMPLE 1. Meanwhile, in EXAMPLE 1 in which both the graphite ratio and the mass ratio of the rubber binder were changed from those of COMPARATIVE EXAMPLE 1, the liquid absorbing time was reduced to 45% of that of COMPARATIVE EXAMPLE 1. As described above, a negative electrode mixture layer containing the graphite particles A in a greater amount in the half region adjacent to the outer surface than in the half region adjacent to the negative electrode collector and also containing the rubber binder in the half region adjacent to the negative electrode collector in an amount of 90 mass % or more, enables significant increase in the absorbing rate of the electrolyte, thereby inhibiting deterioration of the rapid charge and discharge cycle characteristics.

REFERENCE SIGNS LIST 10 non-aqueous electrolyte secondary battery, 11 positive electrode, 12 negative electrode, 13 separator, 14 electrode assembly, 15 battery case, 16 exterior package, 17 sealing assembly, 18, 19 insulating plate, 20 positive electrode lead, 21 negative electrode lead, 22 projecting portion, 23 filter, 24 lower valve element, 25 insulating member, 26 upper valve element, 27 cap, 28 gasket, 30 graphite particle, 32 internal void, 34 external void, 40 negative electrode collector, 42 negative electrode mixture layer, 42a half region adjacent to the negative electrode collector, 42b half region adjacent to the outer surface.

The invention claimed is:

1. A non-aqueous electrolyte secondary battery comprising:
   a negative electrode comprising a negative electrode collector, and a negative electrode mixture layer disposed on a surface of the negative electrode collector, wherein
   the negative electrode mixture layer contains graphite particles A and graphite particles B as a negative electrode active material and a rubber binder as a binder,
   the graphite particles A have an internal porosity of 5% or less, and the graphite particles B have an internal porosity of 8% to 20%,
   the negative electrode mixture layer includes two equally divided half regions in a thickness direction of the negative electrode mixture layer, and the graphite particles A are contained in a half region of the negative electrode mixture layer adjacent to an outer surface of the negative electrode mixture layer in a greater amount than in a half region of the negative electrode mixture layer adjacent to the negative electrode collector, and
   the rubber binder is contained in the half region adjacent to the negative electrode collector in an amount of 90 mass % to 100 mass % of all of the rubber binder contained in the negative electrode mixture layer.

2. The non-aqueous electrolyte secondary battery according to claim 1, wherein
   the graphite particles A and the graphite particles B are contained in the half region adjacent to the outer surface in a mass ratio of 60:40 to 100:0.

3. The non-aqueous electrolyte secondary battery according to claim 1, wherein an average primary particle size of the rubber binder is preferably 120 to 250 nm.

* * * * *